United States Patent
Scoca et al.

(10) Patent No.: US 8,004,934 B2
(45) Date of Patent: Aug. 23, 2011

(54) SPATIAL CORRELATION SONAR METHOD FOR HIGH SHIPS SPEEDS

(75) Inventors: Anthony L. Scoca, Hicksville, NY (US); James Huber, North Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 443 days.

(21) Appl. No.: 12/335,242

(22) Filed: Dec. 15, 2008

(65) Prior Publication Data

US 2010/0149921 A1   Jun. 17, 2010

(51) Int. Cl.
 *G01S 15/58* (2006.01)
(52) U.S. Cl. ........................................ 367/89
(58) Field of Classification Search ............ 367/89, 367/100
 See application file for complete search history.

(56) References Cited

U.S. PATENT DOCUMENTS

| | | | | |
|---|---|---|---|---|
| 4,244,026 A | * | 1/1981 | Dickey, Jr. ............... | 367/89 |
| 7,495,996 B2 | * | 2/2009 | Huber et al. ............. | 367/89 |
| 7,525,875 B2 | * | 4/2009 | Scoca et al. ............. | 367/89 |
| 2007/0064537 A1 | * | 3/2007 | Huber et al. ............. | 367/89 |
| 2008/0144440 A1 | * | 6/2008 | Scoca et al. ............. | 367/89 |
| 2010/0149921 A1 | * | 6/2010 | Scoca et al. ............. | 367/89 |

* cited by examiner

*Primary Examiner* — Dan Pihulic
(74) *Attorney, Agent, or Firm* — Schwegman, Lundberg & Woessner, P.A.

(57) ABSTRACT

In an embodiment, a process measures a velocity of a vessel using a spatial correlation sonar hydrophone array. The process includes the step of selecting a correlation time such that a correlation occurs between an early pulse and a later pulse on a first hydrophone and a second hydrophone respectively, wherein the first hydrophone and the second hydrophone are maximally separated in the spatial correlation sonar hydrophone array. The process further includes the step of selecting a time spacing between a first pulse and a second pulse such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

20 Claims, 5 Drawing Sheets

---

400

410 — A CORRELATION TIME IS SELECTED SUCH THAT A CORRELATION OCCURS BETWEEN AN EARLY PULSE AND A LATER PULSE ON A FIRST HYDROPHONE AND A SECOND HYDROPHONE RESPECTIVELY, WHEREIN THE FIRST HYDROPHONE AND THE SECOND HYDROPHONE ARE MAXIMALLY SEPARATED IN THE SPATIAL CORRELATION SONAR HYDROPHONE ARRAY

420 — A TIME SPACING BETWEEN A FIRST PULSE AND A SECOND PULSE IS SELECTED SUCH THAT THE SPACING IS A FUNCTION OF THE CORRELATION TIME AND A CONSTANT, WHEREIN THE CONSTANT IS PROPORTIONAL TO A SIZE OF THE SPATIAL CORRELATION SONAR HYDROPHONE ARRAY, AND WHEREIN THE CORRELATION TIME IS AN APPROXIMATE MULTIPLE OF A SUM OF A TIME BETWEEN THE FIRST PULSE AND THE SECOND PULSE AND A TIME BETWEEN THE SECOND PULSE AND A NEXT FIRST PULSE

LOW SPEED: EXAMPLE: ILACE SHOWN AS 4

HIGH SPEED: EXAMPLE: ILACE SHOWN AS 1

SPATIAL CORRELATION SONAR METHOD FOR HIGH SHIPS SPEEDS

TECHNICAL FIELD

The present invention relates to a spatial correlation sonar system, and in an embodiment, but not by way of limitation, to a spatial correlation sonar system that functions at all speeds of a vessel including elevated speeds of the vessel.

BACKGROUND

Ships, submarines, and other water navigable craft are equipped with highly complex Navigation SONAR Systems that interface with the craft's central navigation system through a central navigation computer. These systems employ detailed software and/or firmware and extensive hardware on which such software and/or firmware executes. Such systems measure a ship's velocity. When measuring velocity, a SONAR transducer located on the hull of a ship transmit pulses to the ocean bottom. These pulses reflect off the ocean bottom, return to the ship, and are sensed by hydrophones located on the ship's hull. The hydrophones may be in a spatial arrangement, in which there are multiple hydrophones arranged in a spatial geometry such as a square, or in a temporal fashion, one arrangement of which consists of three hydrophones placed at three corners of a square.

When determining velocity, two or more pulses are transmitted to the ocean bottom, reflected off the ocean bottom, received back at the hydrophone array, and correlated amongst the multiple hydrophones to determine which two hydrophones best match the two pulses of interest. The velocity of a ship can then be calculated by dividing the distance between the two correlated hydrophones by twice the time differential between the receipt of the two distinct pulses by the two hydrophones.

A shortcoming of a spatial correlation sonar velocity measuring system is that it has a performance limitation for elevated ship speeds due to the fixed size of its hydrophone array. This limitation gives rise to a steadily degrading velocity error for ship speeds above a threshold value. Because of this fixed-size limitation, the hydrophone position that is best suited for the correlation may actually be outside the bounds of the hydrophone array. This out of bounds condition can occur most often as the velocity of the ship increases, such that a pulse that echoes off the ocean bottom and returns to the ship will be outside the bounds of the array because the increased speed of the ship has caused the hydrophone array to move beyond the bounds of the best correlation hydrophone position.

One manner to address this out of bounds condition is to decrease the interval between the pulses so that the likelihood of correlating pulses falling within the bounds of the spatial correlation sonar hydrophone array increases. However, a problem associated with this method is that a shorter time interval then increases the error caused by positional errors of the hydrophones in the array (i.e., installation errors) and acoustic offset errors of the hydrophones (normally caused by aging of the hydrophones). Another manner to address this problem involves increasing the physical size of the spatial hydrophone array. Yet another manner involves foregoing the use of a spatial correlation sonar hydrophone array and using temporal correlation sonar techniques.

Notwithstanding these techniques to address the problems of measuring speed at higher vessel velocities, the sonar art would benefit from a new method to calculate the velocity of a ship using a spatial correlation sonar hydrophone array. Such a technique would allow for the retention of spatial correlation sonar advantages such as excellent low ship speed performance and accurate velocity measurement of all velocity vectors.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

SUMMARY

Figure 1:
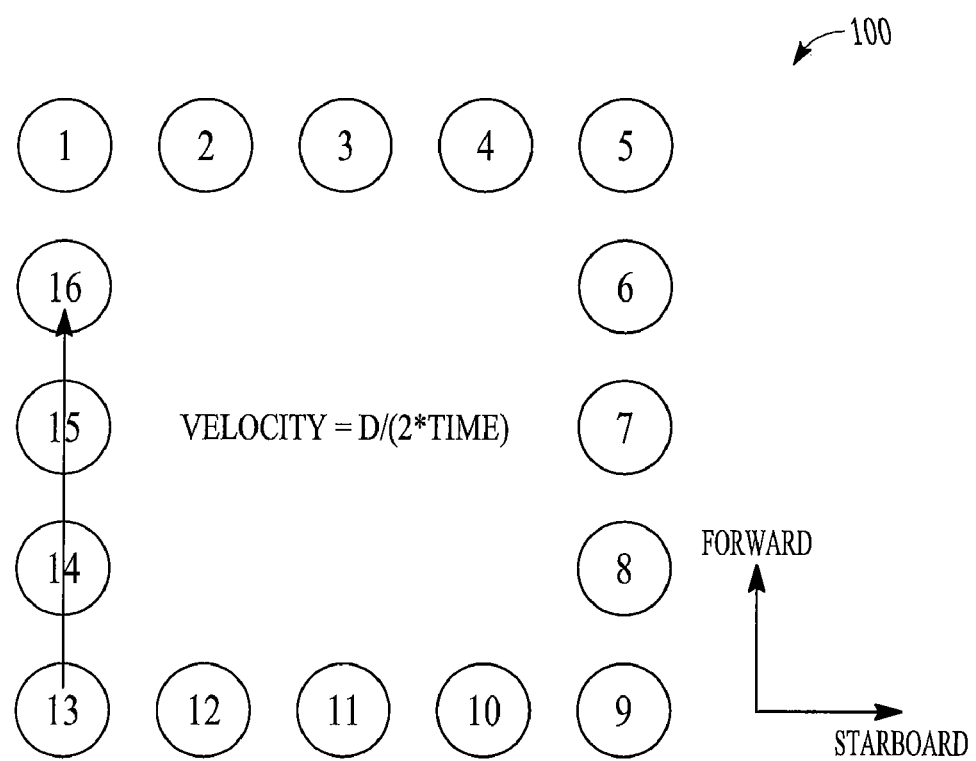
FIG. 1 illustrates an example embodiment of a spatial hydrophone array.

In an embodiment, a process measures a velocity of a vessel using a spatial correlation sonar hydrophone array. The process includes the step of selecting a correlation time such that a correlation occurs between an early pulse and a later pulse on a first hydrophone and a second hydrophone respectively, wherein the first hydrophone and the second hydrophone are maximally separated in the spatial correlation sonar hydrophone array. The process further includes the step of selecting a time spacing between a first pulse and a second pulse such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

An embodiment provides optimal utilization of the fixed size spatial hydrophone array for all ship speeds. An advantage of this embodiment is that it provides for accuracy in measuring velocity for high ship speeds while permitting retention of spatial correlation sonar advantages such as excellent low ship speed performance and accurate velocity measurement of all velocity vectors.

In practice, a spatial correlation sonar uses a correlation time (CT) value as large as possible to reduce velocity error. However, the CT is constrained due to the fixed size of the hydrophone array. The CT is further constrained because one has to allow for changes in the speed of the ship between the time that pulses are transmitted and the time that the pulses are received back at the vessel.

In the prior art, the CT value is calculated based upon approximately 75 percent maximum separation in the direction of the maximum ship velocity. Consequently, for a spatial correlation sonar hydrophone array of, for example, 16 hydrophones (i.e., a 5×5 hydrophone array), and for the example of finite forward speed and zero speed starboard, the CT value is set such that correlated pulses appear on a first hydrophone of the array and a fourth hydrophone of the array. For example, in FIG. 1, the CT time is selected such that correlation is likely to occur between hydrophone numbers 13 and 16. This provides the best correlation in light of the confines of the fixed size of the hydrophone array, and allows for some expansion to the fifth hydrophone (hydrophone number 1 in FIG. 1) for an elevated ship speed.

Therefore, an embodiment provides for use of a correlation time (CT) near the maximum hydrophone separation in the direction of the maximum ship velocity, for example, a separation in magnitude of near four hydrophones in a 5×5 16 hydrophone array. So, as where the prior art used a fixed ratio of approximately 0.75*M (M being equal to the maximum separation of hydrophones), an embodiment of the present disclosure uses F(velocity)*M in which F(velocity) is a fractional value that increases with the speed of the ship. This increase in the maximum hydrophone separation with increasing ships speed takes advantage of ship inertia which limits relative ships speed changes from the time that pulses are transmitted to when they are received. Furthermore, since CT is inversely proportional to velocity, the sensitivity of correlation time to ships speed changes is severely reduced for elevated ships speed.

More specifically, for a spatial correlation sonar, the time between pulses correlated to generate a pulse pair velocity estimate is based on the speed of a vessel and the size of the physical perimeter dimensions of the hydrophone array affixed to the hull of the vessel. The desired correlation time, CT, is given by $$CT = K1/V$$

in which K1 is proportional to the fixed array size and V is the estimated velocity of the vessel.

A prior technique to measure the velocity of a vessel uses the following:

$$A = \max((CT/ILACE) - B, B)$$

in which A is the transmit pulse spacing in time from an odd numbered pulse to the next even numbered pulse, B is the transmit pulse spacing from an even numbered pulse to the next odd numbered pulse, and ILACE is a fixed pulse interlacing integer.

An embodiment of the present disclosure employs a vessel speed dependent ILACE as follows:

$$ILACE = \text{Integer}(K2*CT)$$

in which K2 is a constant.

Figure 3A:
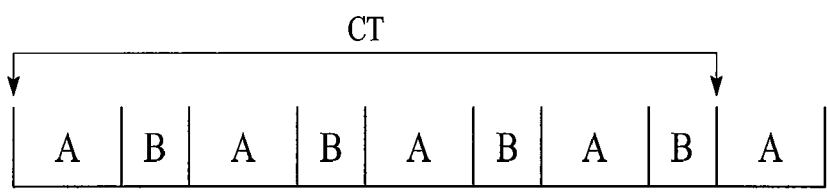
FIG. 3A illustrates a transmit pulse spacing pattern for a vessel at low speed.

The minimum pulse spacing, B, should be large enough so that inter-space echo interference is minimized. Therefore, the prior art ILACE is chosen to be large enough so that CT/ILACE>B. This works well for low ship speeds for which CT is large as is illustrated in FIG. 3A.

Figure 3B:
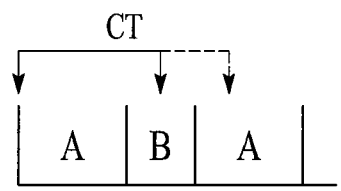
FIG. 3B illustrates a transmit pulse spacing pattern for a vessel at high speed.

However, the performance of this method is degraded for high ship speeds in which CT~A+B (pulses do not in general provide the desired correlation time), as is illustrated in FIG. 3B.

Figure 2A:
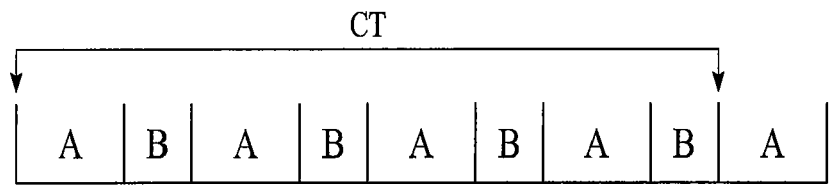
FIG. 2A illustrates a transmit pulse spacing pattern in which the vessel speed is low and the correlation time is large.
Figure 2B:
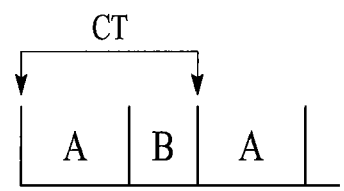
FIG. 2B illustrates a transmit pulse spacing pattern in which the vessel speed is high, the correlation time is low, and the correlation time is approximately equal to a sum of the duration of a first pulse spacing and the duration of a second pulse spacing.

In comparison, an embodiment of the present disclosure works well for both a low vessel speed as shown in FIG. 2A and a high vessel speed as shown in FIG. 2B.

Figure 4:
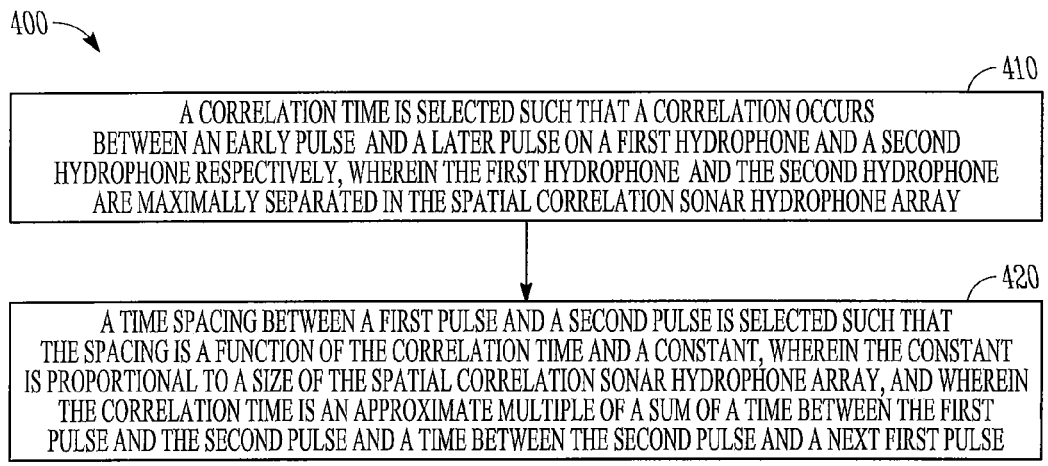
FIG. 4 illustrates a flow chart of an example embodiment of a process to measure a velocity of a vessel using a spatial correlation sonar system.
Figure 5:
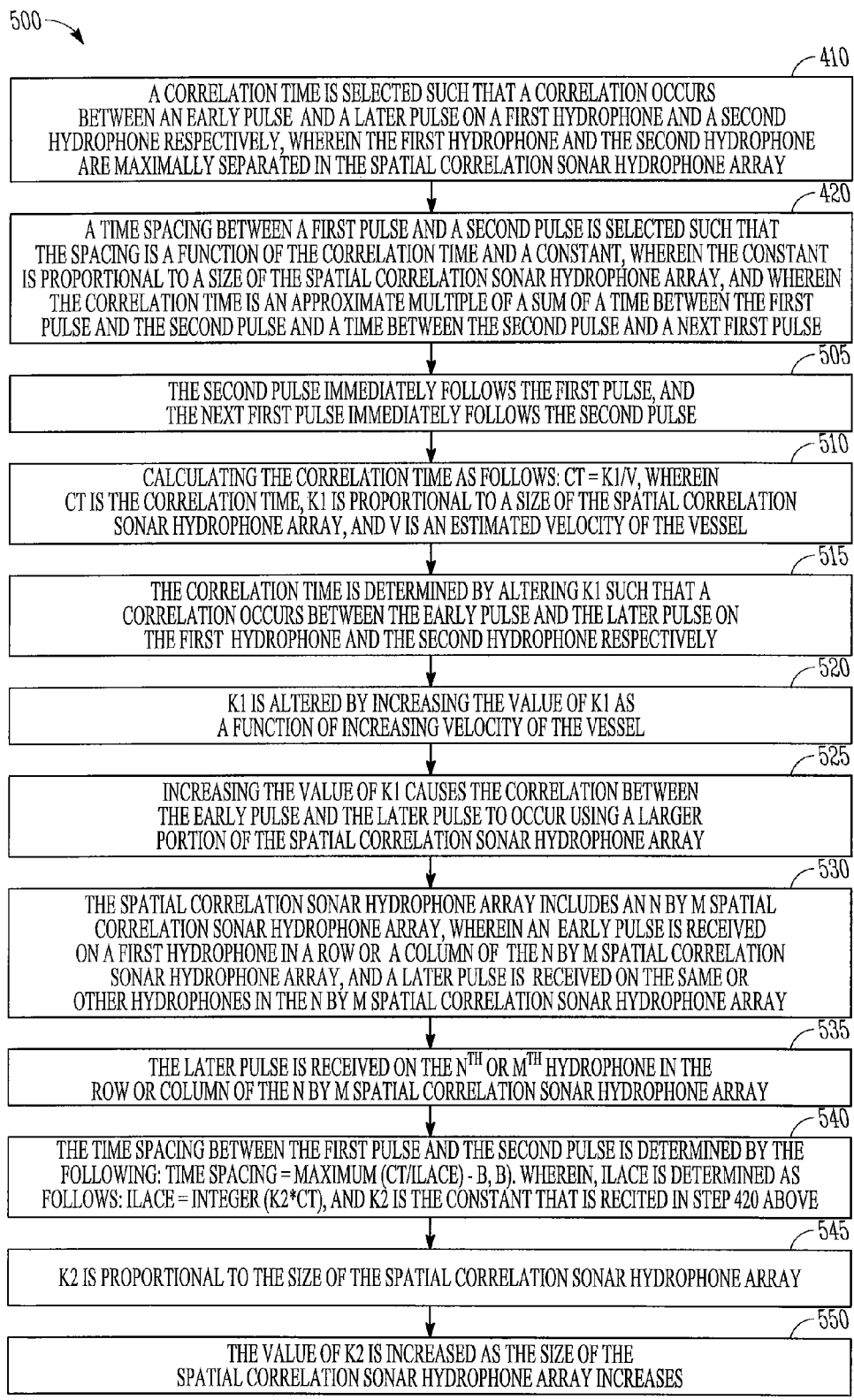
FIG. 5 illustrates a flow chart of another example embodiment of a process to measure a velocity of a vessel using a spatial correlation sonar system.

FIGS. 4 and 5 are flowcharts of example processes 400 and 500 respectively for determining the speed of a vessel using a spatial correlation sonar hydrophone array, and in particular, determining the speed of a vessel when the speed of the vessel is relatively high. FIG. 4 includes two process blocks 410 and 420, and FIG. 5 includes a number of process blocks 505-550. Though arranged serially in the examples of FIGS. 4 and 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to the process 400 of FIG. 4, to measure a velocity of a vessel using a spatial correlation sonar hydrophone array, at 410, a correlation time is selected such that a correlation occurs between an early pulse and a later pulse on a first hydrophone and a second hydrophone respectively, wherein the first hydrophone and the second hydrophone are maximally separated in the spatial correlation sonar hydrophone array. The term maximally separated refers to two hydrophones that are located on opposite sides or perimeters of the example hydrophone array, such as hydrophones 1 and 13 in FIG. 1. At 420, a time spacing between a first pulse and a second pulse is selected such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

The process 500 of FIG. 5 includes the steps 410 and 420 of FIG. 4. The process 500 further includes, an embodiment in which, at 505, the second pulse immediately follows the first pulse, and the next first pulse immediately follows the second pulse. The process 500 of FIG. 5 further includes at 510 calculating the correlation time as follows:

$$CT = K1/V.$$

In the above, CT is the correlation time, K1 is proportional to a size of the spatial correlation sonar hydrophone array, and V is an estimated velocity of the vessel. At 515, the correlation time is determined by altering K1 such that a correlation occurs between the early pulse and the later pulse on a first hydrophone and a second hydrophone respectively. At 520, K1 is altered by increasing the value of K1 as a function of increasing velocity of the vessel, and at 525, increasing the value of K1 causes the correlation between the early pulse and the later pulse to occur using a larger portion of the spatial correlation sonar hydrophone array.

At 530, the spatial correlation sonar hydrophone array is an N by M array. In an embodiment using this array, an early pulse is received on a first hydrophone in a row or a column of the N by M spatial correlation sonar hydrophone array, and a later pulse is received on the same or other hydrophones in the N by M spatial correlation sonar hydrophone array. At 535, the later pulse is received on the $N^{th}$ or $M^{th}$ hydrophone in the row or column of the N by M spatial correlation sonar hydrophone array.

At 540, the time spacing between the first pulse and the second pulse is determined by the following:

$$\text{time spacing} = \text{maximum}(CT/ILACE)-B, B).$$

In the above equation, ILACE is determined as follows:

$$ILACE = \text{Integer}(K2*CT).$$

K2 is the constant that is recited in step 420 above. At 545, K2 is proportional to the size of the spatial correlation sonar hydrophone array, and at 550, the value of K2 is increased as the size of the spatial correlation sonar hydrophone array increases.

Figure 6:
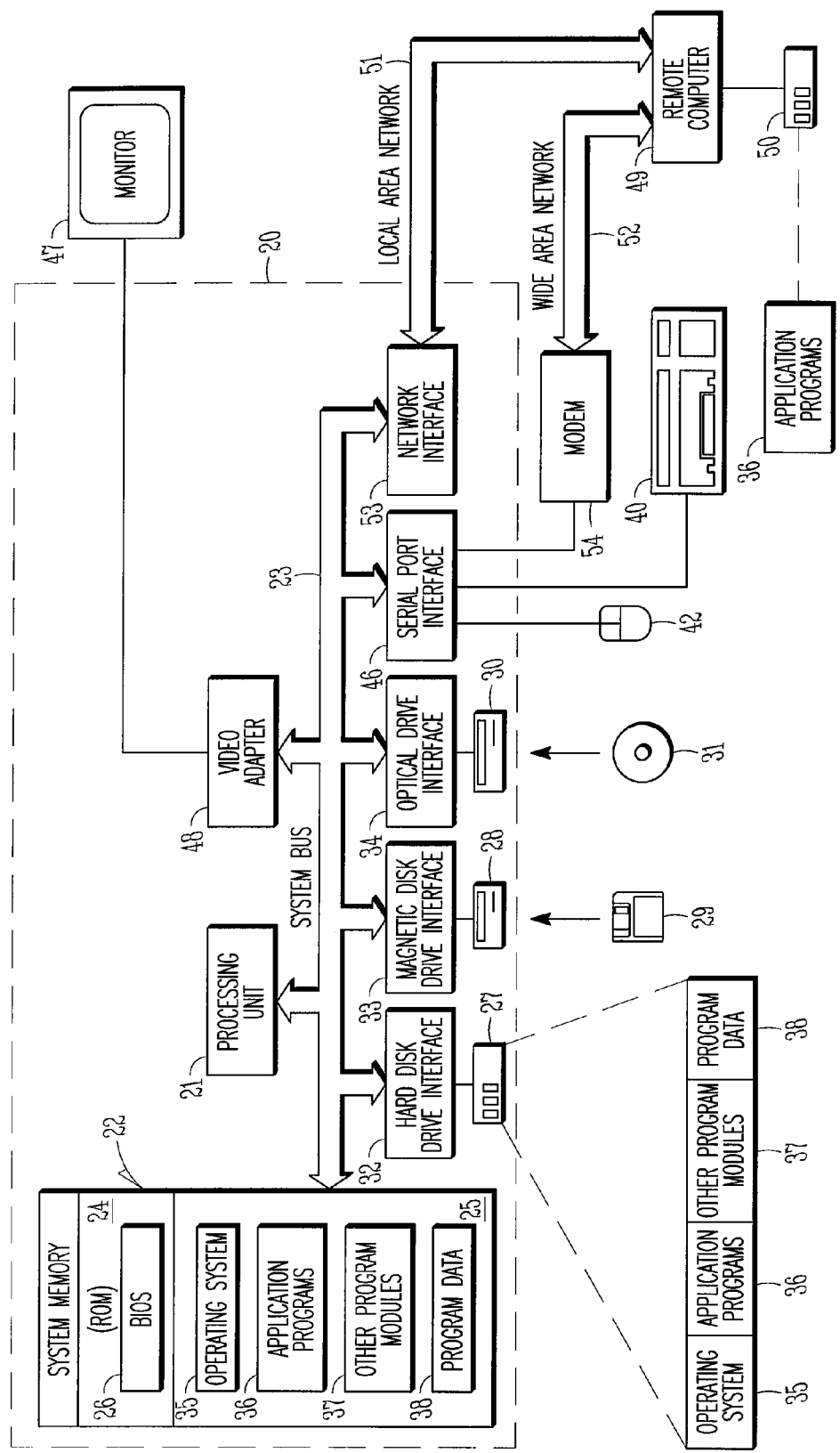
FIG. 6 is an example embodiment of a computer system upon which one or more embodiments of a spatial correlation sonar system can operate.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A process to measure a velocity of a vessel using a spatial correlation sonar hydrophone array comprising:
    selecting a correlation time such that a correlation occurs between an early pulse and a later pulse on a first hydrophone and a second hydrophone respectively, wherein the first hydrophone and the second hydrophone are maximally separated in the spatial correlation sonar hydrophone array; and
    selecting a time spacing between a first pulse and a second pulse such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

2. The process of claim 1, comprising calculating the correlation time as follows:

$$CT = K1/V;$$

wherein CT is the correlation time;
wherein K1 is proportional to a size of the spatial correlation sonar hydrophone array; and
wherein V is an estimated velocity of the vessel.

3. The process of claim 2, wherein selecting the correlation time such that a correlation occurs between the early pulse and the later pulse on the first hydrophone and the second hydrophone respectively is determined by altering K1.

4. The process of claim 3, wherein K1 is altered by increasing the value of K1 as a function of increasing velocity of the vessel.

5. The process of claim 4, wherein increasing the value of K1 causes the correlation between the early pulse and the later pulse to occur using a larger portion of the spatial correlation sonar hydrophone array.

6. The process of claim 1, wherein the spatial correlation sonar hydrophone array comprises an N by M spatial correlation sonar hydrophone array, and wherein the early pulse is received on the first hydrophone in a row or a column of the N by M spatial correlation sonar hydrophone array, and the later pulse is received on the same or other hydrophones in the N by M spatial correlation sonar hydrophone array.

7. The process of claim 6, wherein the later pulse is received on the Nth or Mth hydrophone in the row or column of the N by M spatial correlation sonar hydrophone array.

8. The process of claim 2, wherein the time spacing between the first pulse and the second pulse is determined by the following:

$$\text{time spacing} = \text{maximum } (CT/ILACE) - B, B)$$

wherein ILACE is determined as follows:

$$ILACE = \text{Integer } (K2*CT);$$

wherein K2 is the constant; and wherein B is a time spacing between the second pulse and the next first pulse.

9. The process of claim 8, wherein K2 is proportional to the size of the spatial correlation sonar hydrophone array.

10. The process of claim 9, comprising increasing the value of K2 as the size of the spatial correlation sonar hydrophone array increases.

11. The process of claim 1, wherein the second pulse immediately follows the first pulse, and the next first pulse immediately follows the second pulse.

12. A machine readable medium comprising instructions that when executed by a processor executes a process to measure a velocity of a vessel using a spatial correlation sonar hydrophone array comprising:

selecting a correlation time such that a correlation occurs between an early pulse and a later pulse on a first hydrophone and a second hydrophone respectively, wherein the first hydrophone and the second hydrophone are maximally separated in the spatial correlation sonar hydrophone array; and selecting a time spacing between a first pulse and a second pulse such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

13. The machine readable medium of claim 12, further comprising an instruction for calculating the correlation time as follows:

$$CT=K1/V;$$

wherein CT is the correlation time;

wherein K1 is proportional to a size of the spatial correlation sonar hydrophone array; and wherein V is an estimated velocity of the vessel.

14. The machine readable medium of claim 13, wherein selecting the correlation time such that a correlation occurs between the early pulse and the later pulse on the first hydrophone and the second hydrophone respectively is determined by altering K1, and wherein K1 is altered by increasing the value of K1 as a function of increasing velocity of the vessel; and further wherein increasing the value of K1 causes the correlation between the early pulse and the later pulse to occur using a larger portion of the spatial correlation sonar hydrophone array.

15. The machine readable medium of claim 13, wherein the time spacing between the first pulse and the second pulse is determined by the following:

$$\text{time spacing}=\text{maximum }(CT/ILACE)-B, B)$$

wherein ILACE is determined as follows:

$$ILACE=\text{Integer }(K2*CT);$$

wherein K2 is the constant; and wherein B is a time spacing between the second pulse and the next first pulse.

16. The machine readable medium of claim 15, wherein K2 is proportional to the size of the spatial correlation sonar hydrophone array; and further comprising increasing the value of K2 as the size of the spatial correlation sonar hydrophone array increases.

17. A system comprising a processor configured to measure a velocity of a vessel using a spatial correlation sonar hydrophone array by:

selecting a correlation time such that a correlation occurs between an early pulse and a later pulse on a first hydrophone and a second hydrophone respectively, wherein the first hydrophone and the second hydrophone are maximally separated in the spatial correlation sonar hydrophone array; and selecting a time spacing between a first pulse and a second pulse such that the spacing is a function of the correlation time and a constant, wherein the constant is proportional to a size of the spatial correlation sonar hydrophone array, and wherein the correlation time is an approximate multiple of a sum of a time between the first pulse and the second pulse and a time between the second pulse and a next first pulse.

18. The system of claim 17, further comprising a processor configuration for calculating the correlation time as follows:

$$CT=K1/V;$$

wherein CT is the correlation time;

wherein K1 is proportional to a size of the spatial correlation sonar hydrophone array; and wherein V is an estimated velocity of the vessel.

19. The system of claim 18, wherein selecting the correlation time such that a correlation occurs between the early pulse and the later pulse on the first hydrophone and the second hydrophone respectively is determined by altering K1, and wherein K1 is altered by increasing the value of K1 as a function of increasing velocity of the vessel; and further wherein increasing the value of K1 causes the correlation between the early pulse and the later pulse to occur using a larger portion of the spatial correlation sonar hydrophone array.

20. The system of claim 17, wherein the time spacing between the first pulse and the second pulse is determined by the following:

$$\text{time spacing}=\text{maximum }(CT/ILACE)-B, B)$$

wherein ILACE is determined as follows:

$$ILACE=\text{Integer }(K2*CT);$$

wherein K2 is the constant;

wherein B is a time spacing between the second pulse and the next first pulse;

wherein K2 is proportional to the size of the spatial correlation sonar hydrophone array; and further comprising increasing the value of K2 as the size of the spatial correlation sonar hydrophone array increases.

* * * * *